United States Patent Office 3,295,933
Patented Jan. 3, 1967

3,295,933
PERCHLORAMIDE COMPOUNDS AND PROCESS
Harry Creston Mandell, Jr., Abington, Pa., assignor to Pennsalt Chemicals Corporation, Philadelphia, Pa., a corporation of Pennsylvania
No Drawing. Filed Mar. 6, 1961, Ser. No. 93,799
17 Claims. (Cl. 23—356)

This invention relates to perchloramide compounds and to their preparation. Particularly it relates to novel water-soluble alkali metal perchloramide compounds. More particularly it relates to the perchloramides of potassium, rubidium and cesium, and to perchloramide compounds derived therefrom.

This application is a continuation-in-part of Serial No. 713,095, filed February 4, 1958.

The only perchloramide compounds known and isolated heretofore were $AgHNClO_3$, $NH_4HNClO_3$ admixed with $NH_4F$, and a mixture of $Ba(HNClO_3)_2$ with $BaNClO_3$. (J. Inorg. Nuclear Chem. 2, 348, A. F. Engelbrecht.) Also, the compound $H_2NClO_3$ was heretofore theorized to exist in aqueous solution.

Perchloramide compounds are useful as high energy chemicals. The perchloramide radical, $>NClO_3$, is of interest as a new functional group in synthetic chemical reactions. A compound into which the $>NClO_3$ group is chemically introduced acquires oxidative and explosive properties.

Because of the unique character of the perchloramide compounds and of the perchloramide radical, it is of economic interest that perchloramide compounds be obtained in a chemically pure, soluble form both for direct applied uses and for carrying out reactions in synthetic chemistry. The above silver and barium perchloramide salts, although isolatable in pure form, are, because of their extremely low solubilities in water, unsatisfactory for use in synthesis of other perchloramide compounds. For example, the silver salt, which is more soluble than the barium salts, is soluble only to the extent of about 1 g. per 100 ml. of water. The ammonium salt $$NH_4HNClO_3$$

is highly soluble in water, but because of the method previously necessarily used for its preparation, it has heretofore been obtainable only in admixture with about an equimolar quantity of ammonium fluoride from which physical separation of the $NH_4HNClO_3$ has not been possible. For example, $NH_4HNClO_3$ is prepared in the dry state by Engelbrecht (ibid) by treating anhydrous ammonia with perchloryl fluoride according to the equation:

$$3NH_3 + ClO_3F \rightarrow NH_4HNClO_3 + NH_4F$$

The reaction products, both white solids, are inseparable either by solvent extraction or by sublimation. Thus, heretofore, a pure form of water-soluble perchloramide compound has not been available. Furthermore, no method was formerly known for preparing a wide variety of perchloramide compounds in substantially pure form.

From the art it is known that in order to recover one water-soluble salt in preference to another salt from the same water solution that the desired salt can be separated in unaltered chemical form by precipitation only if its water solubility is substantially different in degree, i.e. greater or less than that of the other salt. In the case of the mixture of $NH_4HNClO_3$ and $NH_4F$, the solubilities of both compounds in water are so nearly alike that they cannot be separated by fractional precipitation, as stated above. Neither can they be separated by any other physical means. For example, if sublimation is used to try to separate the mixture, decomposition of the $$NH_4HNClO_3$$

occurs.

I have now found that only certain dialkali metal perchloramide compounds and certain monohydrogen-monoalkali metal perchloramide compounds, hereafter referred to as monohydrogen perchloramides, have water solubilities which are sufficiently different from the solubilities of the fluoride salts of said metals so that these water-soluble perchloramide compounds can be prepared from the only previously known water-soluble form of perchloramide, the mixture of $NH_4HNClO_3$ and $NH_4F$, and can be separated by precipitation from aqueous solution in a form free from the fluoride salts. I have found that the only alkali metals possessing this characteristic with respect to both their fluoride and perchloramide salts are the metals potassium, rubidium and cesium. Furthermore, I have found that precipitation of the pure dimethal perchloramide from solution occurs principally at a pH in the range above 9, especially in the range 11–12, and that at a pH below about 11 the monohydrogen perchloramide compound begins to form. Therefore, the formation and recovery of said dimetal perchloramide salts is most advantageously carried out at a pH of at least 11, and preferably in the range of 11–12. I have also found that precipitation of the pure monohydrogen perchloramides occurs principally in the pH range above 8 and that their recovery is most advantageously carried out at a pH in the range 8–9. I have further found that perchloramide compounds do not precipitate from solution at a pH below about 8. Thus, in carrying out my invention for separating a water-soluble, fluoride-free perchloramide compound from the $$NH_4HNClO_3\text{--}NH_4F$$

solution a pH of at least 8 is essential.

In essence, I have found that the perchloramide ion, which has the structure $$[N\text{—}\overset{O}{\underset{O}{\overset{\|}{Cl}}}=O]^-$$

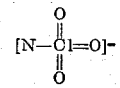

can be recovered as the anion of a useful, water-soluble, fluoride-free compound from an aqueous solution containing said ion in the presence of fluoride anion only by use of potassium, rubidium or cesium as a cation and that such recovery must be carried out at a pH of at least 8, and specifically of about 8 to about 9 if the monohydrogen form of perchloramide compound is desired free of the dimetal form, and at a pH of about 11 to about 12 if the dimetal form is desired free of the monohydrogen form. From the perchloramide compounds thus obtained other substantially pure perchloramides can readily be prepared as hereinafter described.

The practice of my invention results in the preparation of novel, relatively stable, water-soluble perchloramide compounds, hereinafter referred to as my primary compounds, having the formula $MYNClO_3$ wherein M is an alkali metal selected from the group consisting of potassium, rubidium and cesium and Y is selected from the group consisting of potassium, rubidium, cesium and hydrogen. More particularly, my $MYNClO_3$ compounds are monopotassium perchloramide, dipotassium perchloramide, monorubidium perchloramide, dirubidium perchloramide, monocesium perchloramide and dicesium perchloramide. My $MYNClO_3$ compounds include also potassium-cesium perchloramide, potassium-rubidium perchloramide, and cesium-rubidium perchloramide.

My novel method for preparing said $MYNClO_3$ compounds comprises contacting an aqueous solution consisting substantially of $NH_4HNClO_3$ and $NH_4F$ at a temperature in the range from about the freezing point of the solution to about 50° C. for a period of time at least sufficient for metathesis to occur with an alkali metal base wherein the metal is selected from the group consisting of potassium, rubidium and cesium, using an amount of said base sufficient to maintain the reaction mass at a pH of at least 8. When a monohydrogen perchloramide is to be formed, an amount of base equivalent to one molar equivalent of $NH_4HNClO_3$ is used. When a dialkali metal perchloramide is to be formed, two molar equivalents of base are used. An amount of base sufficiently in excess of the respective stoichiometric equivalent is added in each case to adjust the pH to that found necessary for precipitation of the perchloramide to be recovered, i.e. to a range of about 8 to about 9 where Y in $MYNClO_3$ is hydrogen, and to a range of about 11 to about 12 when M and Y are the same, recovering the $MYNClO_3$ product from the reaction mass by physical separation means.

By treating one of the primary perchloramide compounds thus formed with a compound having a desired cation and an anion which upon metathesis with the primary perchloramide compound forms a by-product with a substantially different degree of water solubility from that of the co-formed new perchloramide compound, and further by using the particular pH conditions which I have found to be necessary, I have found that a wide variety of other perchloramide compounds, hereinafter referred to as a derivative, newly-formed, group of compounds, having the $>NClO_3$ radical, can be formed and recovered in substantially pure form. The perchloramide compounds of this derivative group are ionizable compounds wherein $M^1$ represents the cation, and $M^1$ is selected from the group consisting of $(Li^+)_2$, $$[[(CH_3)_4N]^+]_2$$

$Ba^{++}$, $Ca^{++}$, $Mg^{++}$, $Sr^{++}$, $(AgH)^{++}$, $(NH_4H)^{++}$, $[(CH_3)_4NH]^{++}$, $(BaH_2)^{++++}$, $(CaH_2)^{++++}$, $$(MgH_2)^{++++}$$

and $(SrH_2)^{++++}$.

My method for preparation of a derivative perchloramide comprises contacting one of my $MYNClO_3$ compounds at a temperature in the range from about the freezing point of the solution to about 50° C. for a period of time at least sufficient for metathesis to occur with a stoichiometric amount of an ionizable compound $M^2A$ wherein $M^2$ represents $Ag^+$, $Li^+$, $[(CH_3)_4N]^+$, $Ba^{++}$, $Ca^{++}$, $Mg^{++}$, and $Sr^{++}$ and A is an anion which upon metathesis of said $M^2A$ with said $MYNClO_3$ forms a stable compound different in degree of water solubility from that of the newly-formed perchloramide compound, maintaining the pH of the reaction mass at a pH of at least 8 and recovering the newly-formed perchloramide compound from the reaction mass by physical means.

When $M^1$ is $(Na^+)_2$, $(Li^+)_2$, $Ba^{++}$, $Ca^{++}$, $Mg^{++}$, $Sr^{++}$, or $[[(CH_3)_4N]^+]_2$, the pH of the reaction mass is maintained at about 11 to about 12 by addition of a base in which the cation is the same as that of the newly-formed perchloramide compound.

When $M^1$ is $(AgH)^{++}$, $(NH_4H)^{++}$, $[(CH_3)_4NH]^{++}$, $(BaH_2)^{++++}$, $(CaH_2)^{++++}$, $(MgH_2)^{++++}$, or $$(SrH_2)^{++++}$$

the pH of the reaction mass is adjusted to a pH of about 8 to about 9 by addition of an acid, for example $HClO_4$.

I have also found that when the pH is adjusted to about 3 a stable compound, $H_2NClO_3$, is formed. The $H_2NClO_3$ is not recovered from solution, but is available in solution form for use as such, e.g. for forming other perchloramide derivatives.

The primary dimetal perchloramide compounds of my invention, i.e. those wherein, in the formula $MYNClO_3$, M and Y are each selected from the group consisting of potassium, rubidium and cesium, are made by first preparing an aqueous solution of $NH_4HNClO_3$ from perchloryl fluoride and an ammonium compound. For example, a concentrated aqueous solution of an inorganic ammonium compound capable of furnishing ammonium hydroxide in solution, for example ammonia, ammonium hydroxide, or ammonium carbonate, is contacted at a temperature in the range from about 0° C. to 50° C., preferably at 20–30° C., with an amount of perchloryl fluoride at least sufficient to convert about a stoichiometric equivalent of said ammonium compound to a dissolved form of $NH_4HNClO_3$. An equimolar amount of $NH_4F$ is necessarily formed as a physically inseparable by-product in this reaction. The solution containing said $NH_4HNClO_3$ and by-product $NH_4F$ is then contacted at a temperature in the range from about the freezing point of the solution to about 50° C., preferably at 0° C.–20° C., with an alkali metal base in which the metal is selected from the group consisting of potassium, rubidium and cesium, and which is capable of hydrolyzing in water solution, for example, the oxides, hydroxides and carbonates of the respective metals, e.g., potassium oxide, potassium hydroxide, potassium carbonate, rubidium oxide, rubidium hydroxide, rubidium carbonate, cesium oxide, cesium hydroxide and cesium carbonate, in an amount substantially sufficient to convert said $$NH_4HNClO_3$$

to the dimetal perchloramide compound, and sufficiently in excess to maintain the pH of the reaction mass in the range of about 11 to about 12. The product thereupon forms and precipitates from the solution. A soluble metal fluoride, MF, wherein M is the same as defined above, forms and remains in the solution. The reaction is believed to proceed according to the following equation, in which potassium hydroxide is used by way of example of the alkali metal base:

$$NH_4HNClO_3 + 2KOH \rightarrow K_2NClO_3 + NH_4OH + H_2O$$

The alkali metal base is preferably used in the form of a substantially-saturated solution in water or an alcohol, for example, methanol, ethanol, propanol, or isopropanol, preferably ethanol. The $MYNClO_3$ precipitates from the liquid reaction mass and is recovered from the mother liquor by physical separation means, e.g. filtration. The precipitate is washed free of said mother liquor with several portions of 70%–100% alcohol and is dried. The ammonium compound used as a reactant for the preparation of the $NH_4HNClO_3$ is preferably used in the form of a concentrated aqueous solution containing up to about 50% by weight of the ammonium compound, the more concentrated solutions, i.e. in the range 40–50%, being especially advantageous.

The primary monohydrogen perchloramide compounds of my invention are prepared by substantially the same method as the above dimetal compounds except that the amount of alkali metal base used is only about one half, i.e. at least that amount necessary to form the monohydrogen perchloramide, but sufficiently in excess to maintain the pH of the reaction mass at about 8 to about 9 at the end of the reaction.

When the mixed $NH_4HNClO_3-NH_4F$ salt is already available in a previously prepared precipitated form, for example as made by the Engelbrecht method (ibid), said mixed salt may be dissolved to form a solution which then can be treated as described above to prepare my novel water-soluble dimetal or monohydrogen perchloramide compounds.

Under the pH conditions I have found to be necessary, it is also possible to form my novel monohydrogen perchloramide compounds from my novel dimetal perchloramides and the former compounds from the latter compounds. For example, the mono compounds can be made from the dimetal compounds by the steps of contacting an aqueous solution of said dimetal perchloramide, containing preferably from about 5% to about 20% by weight of the dimetal perchloramide with substantially an equimolar amount of $HClO_4$ in the form of an aqueous solution of $HClO_4$, containing preferably from about 1% to about 4% by weight of $HClO_4$, at a temperature in the range from about the freezing point of the solution to about 50° C., preferably at 0° C.–20° C., for a period of time sufficient for metathesis to occur, thereby simultaneously adjusting the pH to the range of from about 8 to about 9; adding to the solution a quantity, preferably equal to between 50% to 100% of the volume of the original perchloramide solution, of an alcohol of 95% to 100% strength, selected from methanol, ethanol, propanol and isopropanol, preferably ethanol, sufficient to facilitate the precipitation of MClO₄, wherein M is the same as defined above, from said solution; separating said MClO₄ from the liquid reaction mass by physical means, as by filtration; evaporating the filtrate to dryness at a temperature below about 60° C., preferably in the range 30°–50° C., under vacuum, and recovering MHNClO₃, wherein M is the same as defined above, as product.

By way of further example, the dimetal perchloramide compounds can be made from monohydrogen perchloramides by the steps of contacting an aqueous solution containing up to a saturating amount of a monohyrogen perchloramide, preferably a saturated solution, with substantially an equimolar quantity of an alkali metal base preferably having the same cation as that of the monohydrogen compound at a temperature in the range from about the freezing point of the solution to about 50° C., preferably at 0° C.–20° C., for a period of time at least sufficient for metathesis to occur to form the dimetal perchloramide, simultaneously adjusting the pH to the range of about 11 to about 12. The dimetal perchloramide is precipitated from the solution by concentrating the solution by evaporation, adding an alcohol, preferably ethanol, and cooling. The precipitated compound is recovered by filtration. It is washed with alcohol and dried as previously described.

The derivative group of perchloramide compounds described above is readily prepared from my primary MYNClO₃ compounds by metathesis of the latter compounds, particularly KHNClO₃ or K₂NClO₃, with particular ionizable compounds having a cation M² as defined above and an anion which when combined with the cations of a primary perchloramide compound will form a by-product salt which will have a water solubility sufficiently different in degree from that of the newly formed perchloramide product so that the by-product and product can be readily separated by physical means. For example, if it is desired that the derivative perchloramide compound remain in solution and that the by-product salt precipitate from the solution, a salt or acid containing the perchlorate or chloroplatinate ion is used. If it is desired that the derivative perchloramide compound precipitate and that the by-product salt remain in solution, a salt or acid containing chloride, fluoride or nitrate ion, for example, is used. It is necessary that the particular compounds used and formed in the preparation of the derivative compounds be stable in aqueous solution at a pH above 8. Particular inorganic salts meeting these requirements at a pH of 11–12 are those having a strongly basic cation selected from the group consisting of $Mg^{++}$, $Ca^{++}$, $Sr^{++}$, $Ba^{++}$, $Na^+$, $Li^+$ and $K^+$. Those suitable for use at a pH of about 8–9 include, in addition, $Ag^+$ and $NM_4^+$ which are but weakly basic.

By means of my method of preparation of derivative perchloramide compounds, H₂NClO₃ and NH₄HNClO₃, the only previously known water soluble perchloramide compounds, now can be prepared free of NH₄F. The diammonium perchloramide compound has not been found to exist.

The method of preparing the derivative group of perchloramides can be more completely understood from the following description wherein the percholarate anion, which is preferred, is used by way of example. Derivative dimetal perchloramides, excepting the barium, are thus made by contacting an aqueous solution containing up to a saturating amount of an inorganic perchlorate selected from the group consisting of LiClO₄, NaClO₄, Ca(ClO₄)₂, Mg(ClO₄)₂, and Sr(ClO₄)₂, preferably a saturated solution, with an aqueous or alcoholic solution containing up to a saturating amount, and preferably a saturated solution, of substantially a stoichiometric amount of a water-soluble perchloramide compound selected from the group consisting of K₂NClO₃, Cs₂NClO₃ and Rb₂NClO₃, preferably K₂NClO₃, at a temperature in the range from about the freezing point of the solution to about 50° C., preferably at 0° C.–20° C., for a period of time at least sufficient for metathesis to occur. The reaction is exemplified by using K₂NClO₃ as the perchloramide starting compound and NaClO₄ as the perchlorate compound:

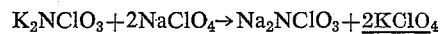

$$K_2NClO_3 + 2NaClO_4 \rightarrow Na_2NClO_3 + \underline{2KClO_4}$$

The least soluble compound of the products, in this case KClO₄, precipitates from the concentrated solution and the products are separated by physical separation means, i.e. filtration. The filtrate, if it contains the perchloramide compound, as in the example given it does, is concentrated and the perchloramide compound recovered from the concentrate by crystallization therefrom.

In the case of barium, a chloride or nitrate anion is used as the anion of the starting co-reactant and the barium perchloramide compound precipitates, leaving the potassium, cesium or rubidium salt in solution.

When the perchloramide compound is less soluble than the co-formed product, the perchloramide compound is precipitated and recovered by physical separation means, such as filtration, washed with alcohol and dried. In the latter situation NH₄HNClO₃, Na₂NClO₃, and Li₂NClO₃ compounds, originally prepared from my novel K₂NClO₃, Cs₂NClO₃, or Rb₂NClO₃ compounds, can also be used as the starting perchloramides. The perchlorate of barium can, in this latter situation, be used in addition to the other soluble reactants.

The monohydrogen perchloramides of the derivative group, except silver and barium, are made by contacting an aqueous solution containing up to a saturating amount of an inorganic compound of the type described above, preferably an inorganic perchlorate selected from the group consisting of LiClO₄, NaClO₄, NH₄ClO₄, Ca(ClO₄)₂, Mg(ClO₄)₂ and Sr(ClO₄)₂, preferably a saturated solution, with an aqueous or alcoholic solution containing up to a saturating amount and preferably a saturated solution, of substantially a stoichiometric amount of a water-soluble monohydrogen perchloramide compound selected from the group consisting of KHNClO₃, CsHNClO₃ and RbHNClO₃, preferably KHNClO₃, simultaneously adjusting the pH to about 8 to about 9 at a temperature in the range from about the freezing point of the solution to about 50° C., preferably at 0° C.–20° C., for a period of time at least sufficient for metathesis to occur. The reaction is exemplified by using KHNClO₃ and LiClO₄ as the starting compounds:

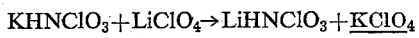

$$KHNClO_3 + LiClO_4 \rightarrow LiHNClO_3 + \underline{KClO_4}$$

The least soluble of the compounds, in this case KClO₄, precipitates and is separated from the solution containing the product. Separation of the products is carried out substantially as described above for the preparation of the dimetal perchloramide compounds. In the case of barium, a chloride or nitrate anion, and in the case of silver, a fluoride or nitrate anion is used as the anion of the starting co-reactant and the barium or silver perchloramide compound, respectively, precipitates, leaving the potassium, cesium or rubidium salt in solution.

When the perchloramide compound is less soluble than the co-formed product, the monohydrogen perchloramide compound is precipitated and recovered by physical separation means, such as filtration, washed with alcohol and dried. In the latter situation NH₄HNClO₃, Na₂NClO₃, and Li₂NClO₃ compounds, originally prepared from my novel $K_2NClO_3$, $Cs_2NClO_3$ or $Rb_2NClO_3$ compounds, can also be used as the starting perchloramides The perchlorate of silver and barium can, in this latter situation, be used in addition to the other soluble reactants.

The dihydrogen perchloramide compound, $H_2NClO_3$, is prepared from either the monohydrogen or the dimetal perchloramides of potassium, rubidium or cesium by treating an aqueous solution of one of said perchloramides with $HClO_4$ and adjusting the pH with excess $HClO_4$ to about 3 to about 4. A perchlorate of the cation of the starting percholramide compound precipitates from the reaction mass upon concentration of the solution, leaving the $H_2NClO_3$ in solution.

I have found also that novel organic derivative perchloramide compounds, monohydrogen tetramethylammonium perchloramide, $(CH_3)_4NHNClO_3$, and tetramethylammonium perchloramide, $[CH_3)_4N]_2NClO_3$, can be prepared by using the compound $H_2NClO_3$ as the intermediate material and adjusting the pH to 8–9 and 11–12, respectively, with tetramethylammonium hydroxide. These organic derivatives are especially useful as explosive materials because of their combination of organic and inorganic radicals which upon combustion leave no residual solids such as can result when a metal-containing perchloramide is exploded or burned. Also, the combustion product gas-forming capacity of these organic compounds is much greater than that of the inorganic perchloramides.

Because of the explosive characteristics of all of the perchloramide compounds, particularly in the form of dry salts, it is preferred, as a precautionary measure, to handle the compounds in a moist form and to avoid friction, shock or high temperatures or large accumulations of the dry salts.

The following examples illustrate the practice of my invention. The parts are by weight unless otherwise indicated.

EXAMPLE 1.—PREPARATION OF $K_2NClO_3$ FROM $NH_4HNClO_3$ and KOH $ClO_3F$ gas was passed into 10 parts of concentrated $NH_4OH$ at room temperature for a period of about 2 hours, forming a solution of $NH_4HNClO_3$ and $NH_4F$ of about 0.44 molar concentration. The heat of reaction was removed by cooling the reaction mass. About 11 parts of KOH, a stoichiometric excess, were then dissolved in about 10 parts of 90% ethanol to prepare a saturated solution of KOH in the alcohol. Insoluble $K_2CO_3$ which precipitated from the solution was removed by filtration. The alcoholic solution of KOH was added to an equal volume of the above reaction mass with stirring. Reaction between $NH_4HNClO_3$ and the KOH was substantially complete upon mixing of the reactants. The pH of the mass was simultaneously adjusted to and maintained above 11. The reaction mass was then cooled to about 0° C to aid precipitation of the product. A heavy white precipitate of crystalline $K_2NClO_3$ was formed. The $K_2NClO_3$ was recovered by filtration and washed with 95% ethanol until free of $NH_4F$, KOH and other materials present in the mother liquor. The $K_2NClO_3$ was then dried under vacuum over a desiccant. X-ray diffraction of the $K_2NClO_3$ product gave a pattern isomorphous with that of $K_2SO_4$.

*Analysis.*—Calculated for $K_2NClO_3$: K, 44.5%; Cl, 20.2%; N, 8.0%. Found: K, 44.3%; Cl, 20.5%; N, 8.1%.

EXAMPLE 2.—PREPARATION OF $CsHNClO_3$ FROM $NH_4HNClO_3$ AND CsOH $ClO_3F$ gas was passed into 10 parts of concentrated $NH_4OH$ as in Example 1 to form $NH_4HNClO_3$ and $NH_4F$. About 2 parts of CsOH were dissolved in about 2 parts of 90% ethanol and were added to the reaction mass with stirring. Reaction was substantially instantaneous. The pH of the reaction mass was simultaneously adjusted and maintained in the range of about 8 to about 9. A heavy white precipitate of $CsHNClO_3$ formed and was recovered by filtration. The $CsHNClO_3$ was washed with 95% ethanol and then dried under vacuum over silica gel.

*Analysis.*—Calculated for $CsHNClO_3$: Cs, 57.4%; Cl, 15.35%; N, 6.05%. Found: Cs, 57.6%; Cl, 15.6%; N, 5.93%.

EXAMPLE 3.—PREPARATION OF $KHNClO_3$ FROM $K_2NClO_3$

Recrystallized $K_2NClO_3$ was dissolved in water. The pH of the solution was found to be about 12. An aqueous solution containing 3% by weight of $HClO_4$ was added slowly to the $K_2NClO_3$ solution at room temperature and reacted therewith until the pH of the latter solution reached about 8.25, $KHNClO_3$ being formed and remaining in solution. The solution containing the $KHNClO_3$ was concentrated by evaporation under vacuum at room temperature to about the saturation point. 95% ethanol was then added to the concentrated solution. Crystalline $KClO_4$ precipitated from the solution and was separated by filtration from the liquid containing the $KHNClO_3$. The latter filtrate was evaporated under vacuum at room temperature. $KHNClO_3$ was recovered as a white crystalline product.

*Analysis.*—Calculated for $KHNClO_3$: K, 28.4%; Cl, 25.8%; N, 10.2%. Found: K, 31.2%; Cl, 25.5%; N, 9.6%.

EXAMPLE 4.—PREPARATION OF $Cs_2NClO_3$ FROM $NH_4HNClO_3$ $ClO_3F$ gas was passed into 10 ml. of concentrated $NH_4OH$ at room temperature for 2 hours, as in Example 1, to form $NH_4HNClO_3$ and $NH_4F$. 10 ml. of 95% ethanol saturated with cesium hydroxide were then added to the solution of $NH_4HNClO_3$ and $NH_4F$. Fine white crystals of $Cs_2NClO_3$ precipitated immediately. The crystals were carefully filtered using a sintered glass crucible and washed four times with 2 ml. portions of 85% ethanol and twice with 2 ml. portions of absolute ethanol. The wet solids were carefully removed from the crucible and dried in a vacuum desiccator over $P_2O_5$. The dried solids were extremely sensitive to friction, exploding forcefully.

*Analysis.*—Calculated for $Cs_2NClO_3$: Cs, 73.1%; Cl, 9.78%; N, 3.85%. Found: Cs, 72.75%; Cl, 9.68%; N, 4.18%.

EXAMPLE 5.—PREPARATION OF $Rb_2NClO_3$ FROM $NH_4HNClO_3$

Following the procedure of Example 4, RbOH, in an amount in excess of the stoichiometric quantity needed and sufficient to adjust the pH of the reaction mass above 11, can be reacted with a $NH_4HNClO_3$–$NH_4F$ solution to form $Rb_2NClO_3$.

EXAMPLE 6.—PREPARATION OF $Li_2NClO_3$ FROM $K_2NClO_3$ $Li_2NClO_3$ can be prepared by first preparing $K_2NClO_3$ according to the procedure of Example 1 and then treating a concentrated aqueous solution of said $K_2NClO_3$ with $LiClO_4$ in the ratio of 2 moles of $LiClO_4$ per mole of $KaClO_3$ at about 5° C. $KClO_4$ forms and precipitates from the solution. The $KClO_4$ is then removed by filtration, leaving $Li_2NClO_3$ in solution. The filtered solution is concentrated cautiously under vacuum at a temperature below about 40° C. The $Li_2NClO_3$ crystals which form can then be recovered by filtration from the concentrate.

EXAMPLE 7.—PREPARATION OF $NaHNClO_3$ FROM $KHNClO_3$ $NaHNClO_3$ can be prepared by first preparing $KHNClO_3$, for example according to the procedure of Example 3, and then treating a concentrated aqueous solution of said $KHNClO_3$ with an equimolar amount of $NaClO_4$ at about 5° C. $KClO_4$ forms and precipitates. The $KClO_4$ is removed by filtration and the filtrate containing the $NaHNClO_3$ is concentrated under vacuum at a temperature of about 40° C. The $NaHNClO_3$ can be recovered in the form of crystals, if desired.

EXAMPLE 8

Following the procedure of Example 2, the monopotassium and monorubidium perchloramide compounds can be made from monoammonium perchloramide.

EXAMPLE 9

Following the procedure of Example 3, the monocesium and monorubidium perchloramide compounds can be made from the dicesium and dirubidium perchloramide compounds respectively.

*Additional examples of preparation of dimetal perchloramides*

Following the procedure of Example 6, dimetal perchloramide compounds of the secondary group can be prepared from my primary dimetal perchloramide compounds and inorganic perchlorates as shown in the following Examples 10–22. In most cases the metal ions present are sufficiently alkaline to give the solution a pH of at least 11. In some cases the pH may be advantageously increased by the addition of a base, preferably one having a metal ion which is the same as that of the primary perchloramide compound. The compound which precipitates first from the reaction mass is underlined.

Ex. No. 10: $K_2NClO_3 + Mg(ClO_4)_2 \xrightarrow{pH\ 11-12} MgNClO_3 + \underline{2KClO_4}$ Ex. No. 11: $K_2NClO_3 + Ca(ClO_4)_2 \xrightarrow{pH\ 11-12} CaNClO_3 + \underline{2KClO_4}$ Ex. No. 12: $K_2NClO_3 + Sr(ClO_4)_2 \xrightarrow{pH\ 11-12} SrNClO_3 + \underline{2KClO_4}$ Ex. No. 13: $Cs_2NClO_3 + 2LiClO_4 \xrightarrow{pH\ 11-12} Li_2NClO_3 + \underline{2CsClO_4}$ Ex. No. 14: $Cs_2NClO_3 + 2NaClO_4 \xrightarrow{pH\ 11-12} Na_2NClO_3 + \underline{2CsClO_4}$ Ex. No. 15: $Cs_2NClO_3 + Mg(ClO_4)_2 \xrightarrow{pH\ 11-12} MgNClO_3 + \underline{2CsClO_4}$ Ex. No. 16: $Cs_2NClO_3 + Ca(ClO_4)_2 \xrightarrow{pH\ 11-12} CaNClO_3 + \underline{2CsClO_4}$ Ex. No. 17: $Cs_2NClO_3 + Sr(ClO_4)_2 \xrightarrow{pH\ 11-12} SrNClO_3 + \underline{2CsClO_4}$ Ex. No. 18: $Rb_2NClO_3 + 2LiClO_4 \xrightarrow{pH\ 11-12} Li_2NClO_3 + \underline{2RbClO_4}$ Ex. No. 19: $Rb_2NClO_3 + 2NaClO_4 \xrightarrow{pH\ 11-12} Na_2NClO_3 + \underline{2RbClO_4}$ Ex. No. 20: $Rb_2NClO_3 + Mg(ClO_4)_2 \xrightarrow{pH\ 11-12} MgNClO_3 + \underline{2RbClO_4}$ Ex. No. 21: $Rb_2NClO_3 + Ca(ClO_4)_2 \xrightarrow{pH\ 11-12} CaNClO_3 + \underline{2RbClO_4}$ Ex. No. 22: $Rb_2NClO_3 + Sr(ClO_4)_2 \xrightarrow{pH\ 11-12} SrNClO_3 + \underline{2RbClO_4}$

*Additional examples of preparation of monohydrogen perchloramides*

Following the procedure of Example 7, monohydrogen perchloramide compounds of the secondary group can be prepared from my primary monohydrogen perchloramides and the monosodium, monolithium and monoammonium perchloramides by reacting them with an inorganic salt, preferably a perchlorate, nitrate, fluoride or chloride, containing a desired metal cation as shown in the following Examples 23–50. In most cases the alkalinity of the reaction mass is in the pH range of 8–9. However, in some cases, it is necessary to adjust the pH. In such cases a base, preferably one having the same metal cation as the primary perchloramide compound, is used, or an acid, preferably perchloric acid. The product which precipitates first from the reaction mass is underlined. The dihydrogen compound is similarly prepared.

Ex. No. 23: $KHNClO_3 + AgNO_3 \xrightarrow{pH\ 8-9} \underline{AgHNClO_3} + KNO_3$ Ex. No. 24: $KHNClO_3 + NH_4ClO_4 \xrightarrow{pH\ 8-9} NH_4HNClO_3 + \underline{KClO_4}$ Ex. No. 25: $2KHNClO_3 + Ba(NO_3)_2 \xrightarrow{pH\ 8-9} \underline{Ba(HNClO_3)_2} + 2KNO_3$ Ex. No. 26: $2KHNClO_3 + Ca(ClO_4)_2 \xrightarrow{pH\ 8-9} Ca(HNClO_3)_2 + \underline{2KClO_4}$ Ex. No. 27: $2KHNClO_3 + Mg(ClO_4)_2 \xrightarrow{pH\ 8-9} Mg(HNClO_3)_2 + \underline{2KClO_42}$ Ex. No. 28: $2KHNClO_3 + Sr(ClO_4)_2 \xrightarrow{pH\ 8-9} Sr(HNClO_3)_2 + \underline{2KClO_4}$ Ex. No. 29: $CsHNClO_3 + LiClO_4 \xrightarrow{pH\ 8-9} LiHNClO_3 + \underline{CsClO_4}$ Ex. No. 30: $CsHNClO_3 + NaClO_4 \xrightarrow{pH\ 8-9} NaHNClO_3 + \underline{CsClO_4}$ Ex. No. 31: $CsHNClO_3 + AgNO_3 \xrightarrow{pH\ 8-9} \underline{AgHNClO_3} + CsNO_3$ Ex. No. 32: $CsHNClO_3 + NH_4ClO_4 \xrightarrow{pH\ 8-9} NH_4HNClO_3 + \underline{CsClO_4}$ Ex. No. 33: $2CsHNClO_3 + Ca(ClO_4)_2 \xrightarrow{pH\ 8-9} Ca(HNClO_3)_2 + \underline{2CsClO_4}$ Ex. No. 34: $2CsHNClO_3 + Ba(Cl)_2 \xrightarrow{pH\ 8-9} \underline{Ba(HNClO_3)_2} + 2CsCl$ Ex. No. 35: $2CsHNClO_3 + Mg(ClO_4)_2 \xrightarrow{pH\ 8-9} Mg(HNClO_3)_2 + \underline{2CsClO_4}$ Ex. No. 36: $2CsHNClO_3 + Sr(ClO_4)_2 \xrightarrow{pH\ 8-9} Sr(HNClO_3)_2 + \underline{2CsClO_4}$ Ex. No. 37: $RbHNClO_3 + LiClO_4 \xrightarrow{pH\ 8-9} LiHNClO_3 + \underline{RbClO_4}$ Ex. No. 38: $RbHNClO_3 + NaClO_4 \xrightarrow{pH\ 8-9} NaHNClO_3 + \underline{RbClO_4}$ Ex. No. 39: $RbHNClO_3 + AgF \xrightarrow{pH\ 8-9} \underline{AgHNClO_3} + RbF$ Ex. No. 40: $RbHNClO_3 + NH_4ClO_4 \xrightarrow{pH\ 8-9} NH_4HNClO_3 + \underline{RbClO_4}$ Ex. No. 41: $2RbHNClO_3 + Ba(Cl)_2 \xrightarrow{pH\ 8-9} \underline{Ba(HNClO_3)_2} + 2RbCl$ Ex. No. 42: $2RbHNClO_3 + Ca(ClO_4)_2 \xrightarrow{pH\ 8-9} Ca(HNClO_3)_2 + \underline{2RbClO_4}$ Ex. No. 43: $2RbHNClO_3 + Mg(ClO_4)_2 \xrightarrow{pH\ 8-9} Mg(HNClO_3)_2 + \underline{2RbClO_4}$ Ex. No. 44: $2RbHNClO_3 + Sr(ClO_4)_2 \xrightarrow{pH\ 8-9} Sr(HNClO_3)_2 + \underline{2RbClO_4}$ Ex. No. 45: $NH_4HNClO_3 + AgClO_4 \xrightarrow{pH\ 8-9} \underline{AgHNClO_3} + NH_4ClO_4$ Ex. No. 46: $2NH_4HNClO_3 + Ba(NO_3)_2 \xrightarrow{pH\ 8-9} \underline{Ba(HNClO_3)_2} + 2NH_4NO_3$ Ex. No. 47: $NaHNClO_3 + AgClO_4 \xrightarrow{pH\ 8-9} \underline{AgHNClO_3} + NaClO_4$ Ex. No. 48: $2NaHNClO_3 + Ba(NO_3)_2 \xrightarrow{pH\ 8-9} \underline{Ba(HNClO_3)_2} + 2NaNO_3$ Ex. No. 49: $LiHNClO_3 + AgClO_4 \xrightarrow{pH\ 8-9} \underline{AgHNClO_3} + LiClO_4$ Ex. No. 50: $2LiHNClO_3 + Ba(NO_3)_2 \xrightarrow{pH\ 8-9} \underline{Ba(HNClO_3)_2} + 2LiNO_3$

*Examples of preparation of fluoride-free $H_2NClO_3$*

$H_2NClO_3$ free of the $NH_4F$ formerly necessarily present in preparation of the compound is readily prepared by reacting an aqueous solution of one of my primary perchloramide compounds with a stoichiometric amount of $HClO_4$ at about 5° C., adding a sufficiently excess amount of $HClO_4$ to adjust the the pH of the reaction mass to the range of about 3 to about 4, concentrating the solution to cause precipitation of by-product metal perchlorate, filtering the reaction mass to remove the metal perchlorate, and recovering the $H_2NClO_3$ in the form of a solution, as exemplified in the following Examples 51–56. The reaction between the $HClO_4$ and the starting dimetal or monohydrogen perchloramide is substantially instantaneous.

Ex. No. 51: $K_2NClO_3 + 2HClO_4 \xrightarrow{pH\ 3-4} H_2NClO_3 + 2KClO_4$

Ex. No. 52: $Cs_2NClO_3 + 2HClO_4 \xrightarrow{pH\ 3-4} H_2NClO_3 + 2CsClO_4$

Ex. No. 53: $Rb_2NClO_3 + 2HClO_4 \xrightarrow{pH\ 3-4} H_2NClO_3 + 2RbClO_4$

Ex. No. 54: $KHNClO_3 + HClO_4 \xrightarrow{pH\ 3-4} H_2NClO_3 + KClO_4$

Ex. No. 55: $CsHNClO_3 + HClO_4 \xrightarrow{pH\ 3-4} H_2NClO_3 + CsClO_4$

Ex. No. 56: $RbHNClO_3 + HClO_4 \xrightarrow{pH\ 3-4} H_2NClO_3 + RbClO_4$

EXAMPLE 57.—USE OF $K_2NClO_3$ IN PERCUSSION PRIMER 4.5 parts of $K_2NClO_3$ are wetted with about 5% of an alcoholic solution of shellac and then mixed with 4 parts of antimony sulfide and 1.5 parts of ground glass. The mixture is loaded into a primer cap by the usual loading procedure and the caps are then allowed to dry. The primer cap thus prepared is then assembled into a small arms cartridge where it serves as a percussion primer.

Other perchloramide compounds can be similarly used in preparing percussion primers and other devices wherein the high energy, explosive force of the perchloramide is the prime moving force. $Na_2NClO_3$ and $CaNClO_3$, which are both derived from my novel potassium, rubidium and cesium perchloramides by the methods I have disclosed, are particularly valuable for such uses, because of their potentially lower cost, from the standpoint of the raw materials used in their preparation compared to those used in the preparation of the other perchloramide compounds.

EXAMPLE 58.—PREPARATION OF $[(CH_3)_4N]_2NClO_3$ FROM $H_2NClO_3$ $H_2NClO_3$ prepared according to the procedure of Example No. 51 was carefully titrated to a pH of 12.2 with an aqueous solution containing 10% of tetramethylammonium hydroxide by weight. A small amount of precipitate was formed and was removed by filtration. The clear filtrate was evaporated cautiously to dryness at a temperature below 65° C. A deposit of crystalline product was recovered. The recovered product was highly sensitive to shock and flame. Analysis of the solids for chlorine not in the form of —$ClO_4$ showed 15.5% chlorine. Calculated chlorine for $[(CH_3)_4N]_2NClO_3$ is 14.46%. Analysis for nitrogen in the >$NClO_3$ radical showed 4.9% actual nitrogen by weight compared to 5.3% theoretical. By calculation it was determined that the product was 83% $[(CH_3)_4N]_2NClO_3$, 11.7% $(CH_3)_4NClO_4$ and the remainder probably $(CH_3)_4NCl$. X-ray diffraction gave no previously known pattern for the product.

Many different embodiments of this invention may be made and many variables obvious to those skilled in the art may be introduced without departing from the scope and spirit thereof and it is to be understood that my invention includes all such embodiments and is not to be limited to the above description.

I claim:
1. A dialkali metal perchloramide compound selected from the group consisting of $K_2NClO_3$, $Cs_2NClO_3$, $Rb_2NClO_3$, $Li_2NClO_3$, and $Na_2NClO_3$.
2. $K_2NClO_3$.
3. $Cs_2NClO_3$.
4. $Na_2NClO_3$.
5. An organic perchloramide compound selected from the group consisting of $(CH_3)_4NHNClO_3$ and

$$[(CH_3)_4N]_2NClO_3$$

6. $[(CH_3)_4N]_2NClO_3$.
7. Process for the preparation and recovery in substantially fluoride-free form of $MYNClO_3$, wherein M is an alkali metal selected from the group consisting of potassium, rubidium and cesium and Y is a cation selected from the group consisting of potassium, rubidium, cesium and hydrogen, from an aqueous solution consisting substantially of $NH_4HNClO_3$ and $NH_4F$ which comprises contacting said solution for a period of time at least sufficient for metathesis to occur at a temperature in the range from about the freezing point of the solution to about 50° C. with an alkali metal base wherein the metal is selected from the group consisting of potassium, rubidium and cesium, using an amount of said base sufficient to maintain the reaction mass at a pH of at least 8, and recovering $MYNClO_3$ from the reaction mass by physical separation means.

8. The process of claim 7 wherein M is potassium.
9. The process of claim 7 wherein M is cesium.
10. The process of claim 7 wherein M is rubidium.
11. The process of claim 7 wherein Y is hydrogen and the pH is in the range from about 8 to about 9.
12. The process of claim 7 wherein M and Y are the same alkali metal and the pH is in the range from about 11 to about 12.
13. A method for the preparation of a perchloramide compound wherein the cation is represented by $M^1$ and is selected from the group consisting of $(Li^+)_2$, $(Na^+)_2$, $[[(CH_3)_4N]^+]_2$, $Ba^{++}$, $Ca^{++}$, $Mg^{++}$, $Sr^{++}$, $(AgH)^{++}$, $(NH_4H)^{++}$, $[(CH_3)_4NH]^{++}$, $(BaH_2)^{++++}$, $(CaH_2)^{++++}$, $(MgH_2)^{++++}$, and $(SrH_2)^{++++}$ which comprises contacting for a period of time at least sufficient for metathesis to occur an aqueous solution of $MYNClO_3$ wherein M is an alkali metal selected from the group potassium, rubidium and cesium and Y is a cation selected from the group consisting of hydrogen, potassium, rubidium and cesium at a temperature in the range from about the freezing point of the solution to about 50° C. with about a stoichiometric amount of an ionizable compound $M^2A$ wherein $M^2$ represents $Ag^+$, $Li^+$, $[(CH_3)_4N]^+$, $(NH_4)^+$, $Ba^{++}$, $Ca^{++}$, $Mg^{++}$ and $Sr^{++}$ and A is an anion which upon metathesis of said $M^2A$ with said $MYNClO_3$ forms a compound different in degree of water solubility from that of the newly formed perchloramide compound, maintaining the pH of the reaction mass at a pH of at least 8, and recovering said newly formed perchloramide compound from the reaction mass by physical separation means.

14. The process of claim 13 wherein $M^2$ is sodium.
15. The process of claim 13 wherein $M^2$ is lithium.
16. The process of claim 13 wherein $M^2A$ is $(CH_3)_4NOH$ and the pH is about 11 to about 12.
17. A method for the preparation in substantially fluoride-free form of a perchloramide compound wherein the cation is represented by $M^1$ and is selected from the group consisting of $(Li^+)_2$, $(Na^+)_2$, $[[(CH_3)_4N]_2^+]$, $Ba^{++}$, $Ca^{++}$, $Mg^{++}$, $Sr^{++}$, $(AgH)^{++}$, $(NH_4H)^{++}$, $[(CH_3)_4NH]^{++}$, $(BaH_2)^{++++}$, $(CaH_2)^{++++}$, $(MgH_2)^{++++}$, and $(SrH_2)^{++++}$ from an aqueous solution consisting substantially of $NH_4HNClO_3$ and $NH_4F$ which comprises contacting said solution with an alkali metal base wherein the alkali metal is selected from the group consisting of potassium, rubidium and cesium for a period of time at least sufficient for metathesis between said $NH_4HNClO_3$ and said alkali metal base to occur, using said base in sufficient excess to adjust the pH of the reaction mass after metathesis of the reactants to a pH of at least 8, thereby precipitating $MYNClO_3$, wherein M is said alkali metal and Y is selected from the group consisting of hydrogen and said alkali metal; recovering said $MYNClO_3$ from said reaction mass by physical separation means; contacting an aqueous solution of said $MYNClO_3$ with an ionizable compound $M^2A$ wherein $M^2$ represents $Ag^+$, $Li^+$, $[(CH_3)_4N]^+$, $(NH_4)^+$, $Ba^{++}$, $Ca^{++}$, $Mg^{++}$ and $Sr^{++}$ and A is an anion which upon metathesis of said $M^2A$ with said $MYNClO_3$ forms a compound different in degree of water solubility from that of the newly formed perchloramide compound, maintaining the pH of the reaction mass at a pH of at least 8, and recovering said newly formed perchloramide compound from the reaction mass by physical separation means.

References Cited by the Examiner

UNITED STATES PATENTS

| | | | |
|---|---|---|---|
| 3,002,807 | 10/1961 | Becke | 23—14 |
| 3,024,283 | 3/1962 | Metcalfe et al. | 260—567.6 |
| 3,028,427 | 4/1962 | Winicov | 260—567.6 |
| 3,037,838 | 6/1962 | Lindner | 23—14 |

OTHER REFERENCES

Perchloryl Fluoride, $ClO_3F$.
Preparation and Some Physical and Chemical Properties by Engelbrecht et al., Journal of Inorganic and Nuclear Chemistry, vol. 2, pp. 348–357, July 1956, Pergamon Press, London and New York, 1955.

OSCAR R. VERTIZ, *Primary Examiner.*

MAURICE A. BRINDISI, *Examiner.*

M. N. MELLER, H. S. MILLER, *Assistant Examiners.*

UNITED STATES PATENT OFFICE
CERTIFICATE OF CORRECTION

Patent No. 3,295,933                  January 3, 1967

Harry Creston Mandell, Jr.

It is hereby certified that error appears in the above numbered patent requiring correction and that the said Letters Patent should read as corrected below.

Column 2, lines 15 and 16, for "dimethal" read -- dimetal --; lines 36 to 39, the formula should appear as shown below instead of as in the patent:

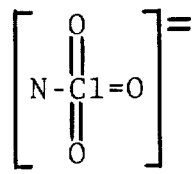

column 3, line 11, for "where" read -- when --; column 5, line 9, for "$MCIO_4$" read -- $MClO_4$ --; line 20, for "monohyrogen" read -- monohydrogen --; line 61, for "$NM_4^+$" read -- $NH_4^+$ --; line 70, for "percholarate" read -- perchlorate --; column 7, line 12, for "percholramide" read -- perchloramide --; line 18, for "$[CH_3)_4N]_2$" read $[(CH_3)_4N]_2$ --; column 8, line 64, for "$KaClO_3$" read -- $K_2NClO_3$ --; column 10, line 12, for "$\underline{KClO}_4 2$" read -- 2 $\underline{KClO}_4$ --.

Signed and sealed this 26th day of September 1967.

(SEAL)
Attest:

ERNEST W. SWIDER                      EDWARD J. BRENNER
Attesting Officer                   Commissioner of Patents